Figure 1:
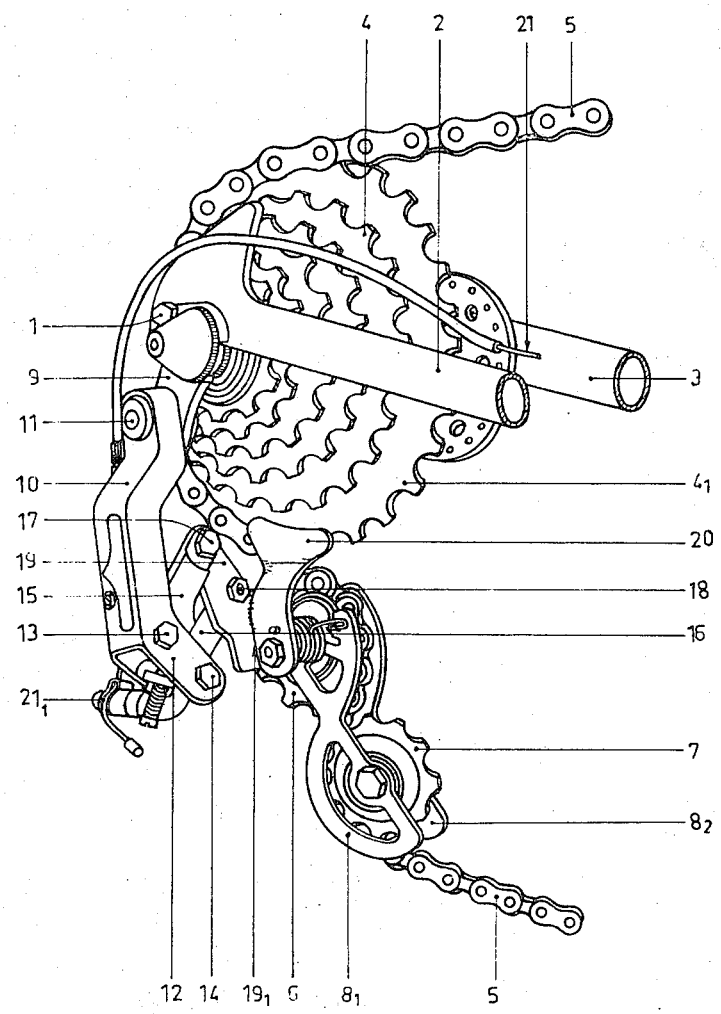

United States Patent
Huret et al.

[11] 3,803,933
[45] Apr. 16, 1974

[54] GEAR SHIFT DEVICE PARTICULARLY FOR BICYCLES

[76] Inventors: Roger Henri Marius Huret; Jacques André Huret, both of 60, Avenue Felix Faure, Nanterre, France

[22] Filed: June 19, 1972

[21] Appl. No.: 264,220

[30] Foreign Application Priority Data
Sept. 17, 1971 France .............................. 71.33636

[52] U.S. Cl. .............................................. 74/217 B
[51] Int. Cl. ............................................. F16h 11/00
[58] Field of Search ................................... 74/217 B

[56] References Cited
UNITED STATES PATENTS
| | | | |
|---|---|---|---|
| 3,448,628 | 6/1969 | Shimano | 74/217 B |
| 3,702,080 | 11/1972 | Huret | 74/217 B |
| 3,677,103 | 7/1972 | Huret | 74/217 B |

FOREIGN PATENTS OR APPLICATIONS
| | | | |
|---|---|---|---|
| 941,235 | 0/1963 | Great Britain | 74/217 B |
| 601,743 | 0/1948 | Great Britain | 74/217 B |
| 497,071 | 0/1954 | Italy | 74/217 B |
| 988,439 | 0/1965 | Great Britain | 74/217 B |
| 931,849 | 0/1963 | Great Britain | 74/217 B |
| 888,511 | 0/1962 | Great Britain | 74/217 B |

Primary Examiner—Charles J. Myhre
Assistant Examiner—R. H. Lazarus
Attorney, Agent, or Firm—Seidel, Gonda & Goldhammer

[57] ABSTRACT

The invention relates to a gear shift device particularly for bicycles ensuring the efficient guidance of the chain, this device comprising a deformable parallellogram of which one of the branches is fixed and forms the support of the gear shift, and of which the opposite branch, in movement during the translation, supports the guiding and tensioning rollers for the chain passing over the free wheel, the gear shift device being characterized in that the branch of the parallellogram supporting the rollers is part of an anchor directed toward the free wheel, this anchor in addition being located in a plane parallel to the plane of the rollers, but offset slightly, with respect to the plane of the rollers, toward the deformable parallellogram.

2 Claims, 2 Drawing Figures

GEAR SHIFT DEVICE PARTICULARLY FOR BICYCLES

The invention relates to a gear shift device, particularly for bicycles.

The known gear shift devices are fixed close to the free wheel mounted in the axle of the rear wheel of a cycle and comprise a first roller for the transversal guidance of the chain when this chain is displaced from one pinion of the free wheel to another and a tensioning roller maintaining the chain under virtually constant tension, whatever the diameter of the pinion of the free wheel may be.

The transversal displacement of this assembly is realized by various means including, either a guiding axle, or a deformable parallellogram actuated by a cable. However, at present, there is an increasing desire to use wheels of considerably different diameters, which causes difficulties, particularly in passing the chain from a smaller pinion of a free wheel to a larger pinion of a free wheel.

To overcome this disadvantage, there has been provided a guide pivoting freely above the axis of the guiding roller of the chain, this guide framing the portion of the chain located between this guiding roller and the pinions of the free wheel.

However, this device also has some disadvantages. Thus, since it pivots freely about its axis, the guide can very frequently knock against the chain, which causes a rapid wear of the latter.

In addition, since this guide must pivot about its axis when the chain passes from one pinion of the free wheel to another, this becomes a means of reducing the speed in changing over from one pinion to the other, this speed reduction being all the greater, the greater the braking action on the pivoting movement of this guide about its axle.

The particular object of this invention is to overcome these disadvantages and relates, to this end, to a gear shift device, particularly for bicycles, comprising a deformable parallelogram of which one of the branches is fixed and forms the support of the gear shift, and of which the opposite branch, in movement during translation, supports the guiding and tensioning rollers for the chain passing over the free wheel, this gear shift device being characterized in that the branch of the parallelogram supporting the rollers is a part of an anchor directed toward the free wheel, this anchor being in addition located in a plane parallel to the plane of the rollers, but offset slightly, with respect to the plane of the rollers, toward the deformable parallelogram.

According to another characteristic feature of the invention, the opposite branches of the deformable parallelogram, of which one forms the support of the gear shift and of which the other is part of the anchor, form an acute angle with this anchor, these branches and this anchor being such that the anchor moves away from the axle of the free wheel when the parallelogram is deformed to bring the chain onto a pinion of greater diameter.

Figure 2:
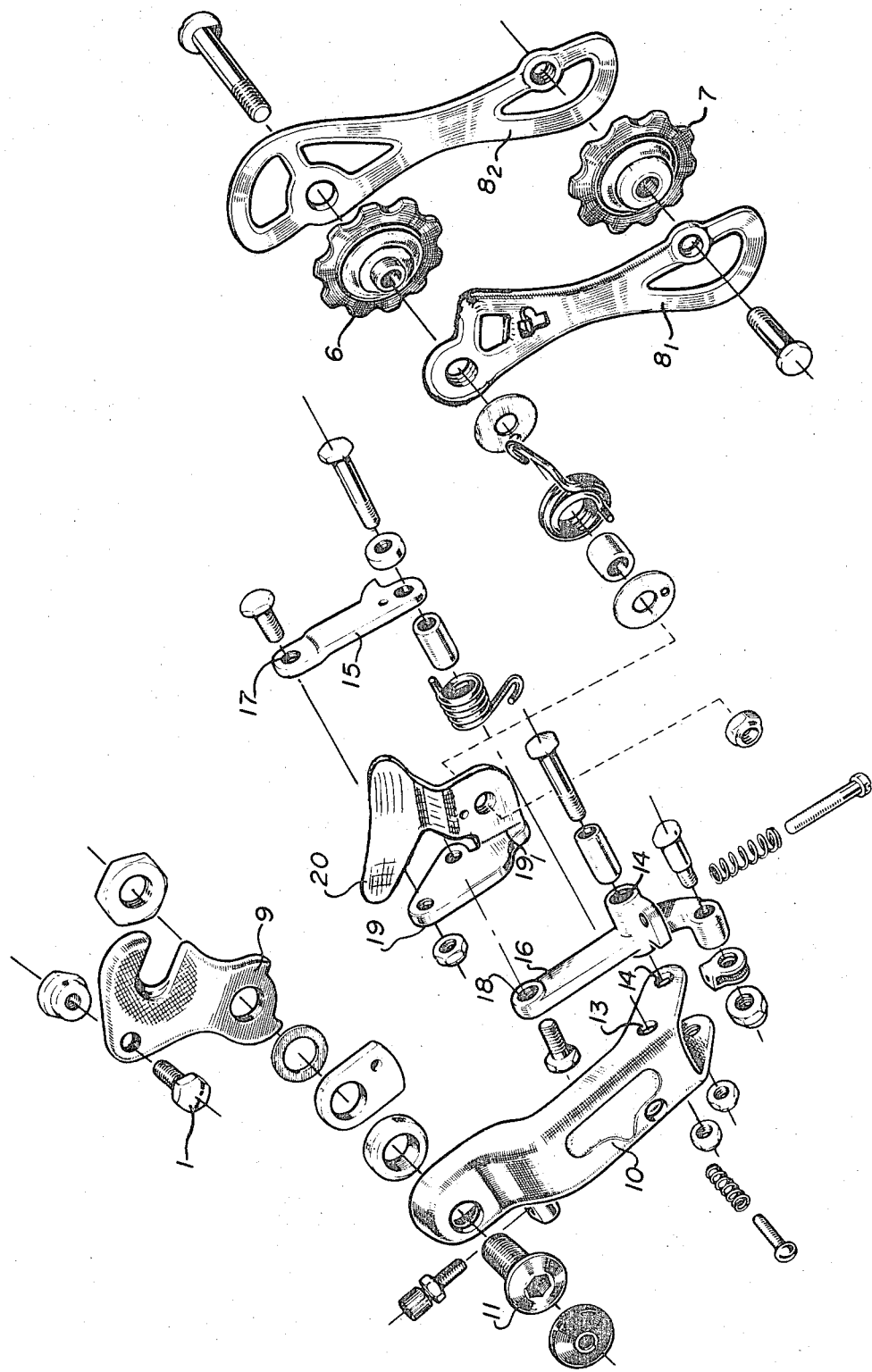

The invention is illustrated, by way of a nonlimitative example in the accompanying drawing wherein FIG. 1 is a perspective view of a gear shift in accordance with the invention, mounted on a bicycle which is represented partially, and FIG. 2 is an exploded view of the gear shift shown in FIG. 1.

The invention relates therefore to a shift gear which enables the chain to be displaced rapidly and accurately to make it pass from one pinion of a free wheel to the other, even if the difference between the diameters of these pinions is considerable.

This gear shift device is fixed by a nut 1 on the branch 2 of the rear fork of the bicycle.

This fork consists of branches 2 and 3 and supports the axle of the rear wheel of the cycle which is provided with the free wheel 4. A driving chain 5 passes over one of the pinions of this free wheel, then over a guiding roller 6 of the chain and finally over a roller 7 which controls the tension in the chain.

The rollers 6 and 7 located in the same plane are supported by parts $8_1$ and $8_2$ which, in addition, partially frame the rollers in order to maintain the chain on these rollers.

The gear shift comprises a first support part 9 fixed to the fork 2 by the nut 1, then by a second support part 10 fixed by a nut 11 to the part 9. This part 10 forms, with its lower end 12, one of the deformable branches of a parallelogram, this branch being delimited by the distance separating the two articulation axles 13 and 14. On axle 13 there is an articulated rod 15, while on the axle 14 there is an articulated rod 16. The end of the two articulated rods 15 and 16 comprises the articulation axles 17 and 18 for the fourth branch of the deformable parallelogram, which consists of a part 19. This part 19 is bent at $19_1$ and forms a plate 20 which is placed at a level between the free wheel 4 and the guiding roller 6 and more precisely at the height of the pinion with the greatest diameter. This plate 20 is, in addition, placed in a plane parallel to the plane of the rollers 6 and 7, but slightly offset from this plane in the direction of the deformable parallellogram, of which the four apices consist of the axles 13, 14, 17, 18.

This plate enables the chain to be guided when it passes from one pinion of the free wheel to the other, whatever the difference in the diameter of these pinions may be.

The plate 20 plays its guiding role in particular when the chain passes from a smaller pinion to a larger pinion by exerting a lateral pressure on the chain so that it is rapidly in position again in the plane of the rollers 6 and 7 which had just been displaced laterally.

In addition, the opposite branches 12 and 19 of the parallelogram, which are limited respectively by the axles 13, 14 and 17, 18, are placed in a manner such that the branches form an acute angle with the plate 20, these branches and this angle being such that the anchor moves away from the axle of the free wheel when the parallelogram is displaced to bring the chain onto a pinion of greater diameter.

It is seen therefore in this construction that when the parallelogram is deformed by acting upon the driving cable 21 connected at $21_1$ to a prolongation of the branch 16 of the parallellogram, the level of the plate 20 is changed.

Thus, when the plane of the rollers 6 and 7 is identical with that of the pinion with a smaller diameter of the free wheel 4, the branches 15 and 16 are pivoted in a manner such that the articulations 17 and 18 are at their highest possible level. The distance between the plate 20 and the pinion of smaller diameter is therefore small enabling an optimal guiding of the chain to be effected.

Likewise, when the chain is passed onto a pinion of greater diameter by deforming the parallelogram, the level of the articulation axles 17, 18 are lowered in order also to lower the level of the plate 20. The distance from the pinion concerned is thus virtually identical, even if the pinion concerned is of greater diameter.

Consequently, because of the position of the plate with respect to the deformable parallellogram, and because of the acute angle which this plate forms with the branches 12 and 19 of the parallelogram, the plate 20 is always located at a level between the levels of the pinions of greater diameter and of smaller diameter of the free wheel 4.

It is obvious that this invention is not limited to the example of its application hereinabove described and illustrated and that on the basis of it other modes and forms of applications can be envisaged without departing from the scope of the invention.

What I claim is:

1. A gear shift for a bicycle wheel of the type comprising a plurality of different size sprockets rotatable about an axis and guiding and tensioning rollers for a sprocket chain comprising, a parallelogram comprising four interconnected links, means mounting one of said links in said parallelogram in fixed position with respect to said bicycle, the other links in said parallelogram being pivotally connected to each other so that said parallelogram is deformable, said guiding and tensioning rollers being supported by said link opposite said fixed link for movement therewith, and means for guiding the sprocket chain as it moves from one sprocket to another being connected to and supported by said last named link for movement therewith, said guide means lying in a plane which is parallel to the plane in which said guiding and tensioning rollers lie but displaced slightly therefrom toward said parallelogram.

2. A gear shift according to claim 1 wherein said guide means is disposed at an acute angle with respect to said fixed link and said link opposite said fixed link, said fixed link being disposed below the axis of said sprockets and sloping downwardly and toward the plane of said guiding and tensioning rollers so that when said parallelogram is deformed to bring the sprocket chain onto a sprocket of greater diameter, said guide means moves away from the axis of said sprockets.

* * * * *